United States Patent Office 3,306,095
Patented Feb. 28, 1967

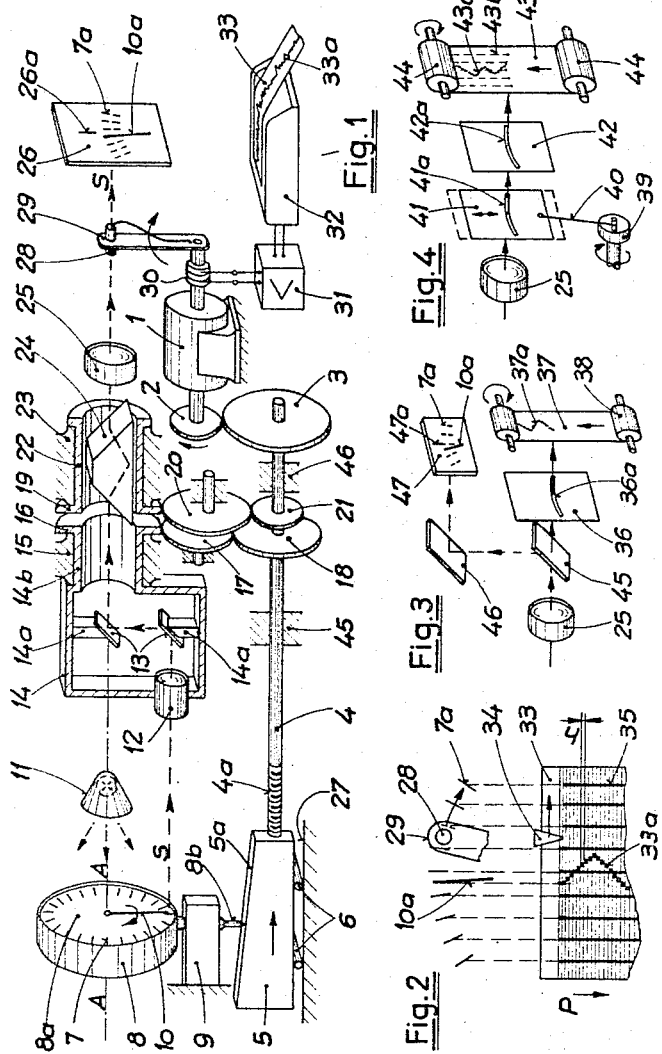

3,306,095
APPARATUS FOR ASCERTAINING THE ERRORS OF INDICATOR MEASURING DEVICES
Hans Meyer, Le Bugnon 24, Renens, Vaud, Switzerland
Filed Oct. 12, 1964, Ser. No. 403,092
Claims priority, application Switzerland, Oct. 21, 1963, 12,925/63
10 Claims. (Cl. 73—1)

The present invention concerns an apparatus for ascertaining errors of indication of measurement indicating devices.

The ascertainment of the errors of measurement indicating devices, particularly of dial gauges, is generally effected by comparison of the indicated values with known measurement values. Deviations observed can then be combined into a graph showing the errors.

There are international standard recommendations and national standard regulations which contain the maximum admissible error tolerances. In general those are fixed for a so-called course range (from pointer rotation to pointer rotation), and a fine range (e.g. for 1 tenth pointer rotation). The observance of the latter regulation implies that within one fine range at least some measurement checks are to be made, a feature which, with a normal dial gauge, gives a large number of measurements.

In large scale manufacture by today's methods, it is not economically possible to check every dial gauge in this manner. In practice a few measurement points distributed over the entire measurement range are selected and the fine ranges which are particularly important in measurement are not checked.

Proposals have been made for simplifying the tedious measuring process. In accordance with one proposal a disc bearing a mark turns synchronously with the pointer of the dial gauges to be checked. Pointer and mark are made to coincide optically and be compared with each other. If the dial gauge to be checked shows no error, pointer and mark remain coinciding and unchanged; deviations are shown by deflections of the position of the pointer from the mark.

The method simplifies the work to a certain degree in that parallax errors are optically excluded from the reading. In addition it is possible to follow the deflections of the pointer continuously. On the other hand, the image of pointer and mark turning during the adjustment of the dial gauge is confused. It should also be pointed out that faults orginating from deviations in the division of the scale are not included. No appreciable saving of time is obtained in preparing error graphs, since the individual measurement points have to be determined one after the other as previously.

Another proposal is to allow the dial gauge to be checked to turn about the axis of the pointer during its adjustment by a micrometer screw, for example, so that the pointer is stopped to an observer and thus can be compared with a fixed mark. In this case it is also possible to observe the measurement deflections continuously during the adjustment. The disadvantage is that the dial gauge is turned about its own axis during measurement, a feature which does not correspond to its practical operating condition. As with the first method errors in the scale are not included.

With the inclusion of an error graph, a small saving in time results, because it is more convenient to read the position of a stationary pointer in comparison with a mark than that of a turning pointer.

The object of the present invention is to provide an apparatus whereby the foregoing disadvantages may be eliminated.

According to the present invention, in the case of an indicating instrument to be tested being stationary, the turning of the pointer is optically eliminated for an observer. In a further embodiment of the proposed apparatus it is possible to record the error graph of the recording instrument to be checked automatically and very quickly even for very small measuring spaces (e.g. from scale mark to scale mark). It is also possible to observe visually the deflections of the pointer during the recording of the error graph.

The invention will be described further, by way of example, with reference to the accompanying drawings, in which:

FIGURE 1 is a schematic view of a testing device for dial gauges;

FIGURE 2 shows a detail of the recording process;

FIGURE 3 is one variation of the recording operation; and

FIGURE 4 is a second variation thereof.

In FIGURE 1 the motor 1 drives by way of gears 2 and 3, a shaft 4 which is journalled in fixed bearings 45 and 46 in a fixed casing (not shown) and secured therein by means (not shown) against axial displacement. At one end the shaft 4 has a thread 4a which engages in a corresponding female thread of a wedge 5 running on rollers 6 on a track 27 on the casing. If the gear 2 turns in the direction of the arrow then the wedge 5 likewise moves in the direction of the arrow. Disposed on the surface 5a of the wedge is the plunger 8b of a dial gauge 8 rigidly fixed to the casing by a support 9. The dial gauge 8 is provided with a dial 8a and a scale 7 fitted thereon.

A body 14, which is shown in cross-section, has a tubular connection 14b which is journalled in a fixed bearing 15 of the casing (not shown), and is rotatably driven about the pointer axis A—A by gears 18, 17 and 16 from the shaft 4. The body 14 contains an objective 12 and two deflecting mirrors 13 which are mounted on supports 14a of the body 14. This gear transmission is designed so that the objective 12 is always directed towards the tip of the pointer 10 during rotation of said pointer, that is to say, turns therewith at the same angular speed.

The image passing through the lens 12 is deflected by the two mirrors 13 rotating with the body 14, into the axis A—A and meets a so-called Dove's prism 24 fixed in a tube 22 shown in cross-section and turning about the axis A—A. The tube 22 which is rotatably received in the bearing 23 is driven from the shaft 4 by way of gears 21, 20 and 19. The gear ratios are such that the prism 24 turns in the same direction as the objective, but with half the angular speed.

The image received is projected on to the focussing screen 26 by a lens 25 arranged in the path of the rays S—S.

The testing operation proceeds as follows:

Under the influence of the wedge 5 displaced by the motor 1, through the gears 2 and 3, shaft 4 and the thread 4a in the direction of the arrow, the plunger 8b of the dial gauge 8 is continuously moved upwards and the pointer 10 is turned thereby. The objective 12 which is aligned with the tip of the pointer and the body 14 of which is rotated by the shaft 4 through the gears 18, 17 and 16, follows the pointer in its movement and forms an image thereof which reaches the prism 24 through the deflecting mirrors 13. The prism turns, driven by the shaft 4 through the gears 21, 20 and 19, at half the angular speed of the objective about its own axis and thereby stops in a known manner the rotation of the image produced by the objective. The image produced at the outlet of the prism is magnified by the lens 25 and thrown on to the screen 26.

An illuminated device 11 ensures that the part of the image on the dial gauge to be projected receives sufficient light. It is possible in known manner to arrange the lighting device externally of the axis of the pointer and to convey the light by a mirror, for example, arranged in the axis of the pointer, to the dial. A concentrated illumination of the tip of the pointer to be pictured can then be achieved if the said mirror is controlled by the shaft 4, for example, so that the light follows the rotating tip of the pointer.

If the dial gauge to be checked shows no measurement errors, i.e. the pointer 10 always points exactly to the value on the scale 8a corresponding to the position of the wedge 5, the image 10a of the pointer appears stationary on the screen 26, compared with the mark 26a formed thereon. If, however, the pointer 10 deviates from its ideal position, i.e. if the dial gauge 8 shows errors of measurement, the image 10a of the pointer appears displaced relatively to the mark 26a. The error of measurement can be recognised from the extent of this displacement.

Since the movement of the pointer proceeds continously over the entire measuring area, deviations visible on the screen 26 can be easily followed visually during the turning of the pointer 10.

While the image of the pointer on the screen 26 appears to be relatively stationary, the component strokes of the scale 8a, which are also projected, move past the observer.

By intermittent illumination controlled from the shaft 4, for example, it is possible also to regard the component strokes 7a, which also appear on the screen 26, as apparently stationary. For this purpose illumination is always effected when the pointer is theoretically in front of a stroke of the scale.

The apparatus shown in FIGURE 3 makes it possible to record the behaviour of the pointer 10 continuously as it rotates. Instead of the screen 26, a recording strip 37 of sensitive material is used which is moved over rollers 38 always in the direction of the arrow transversely to the projected rays. A diaphragm 36, the opening 36a of which limits the image of the pointer practically to one point, is disposed between the recording strip 37 and lens 25. The continuous recording of this puntiform image of the indicator gives the recording curve 37a which, compared with a corresponding standard, shows the graph of the errors of the dial gauge 8.

With intermittent illumination of the dial gauge as mentioned above, the strokes of the scale also appear as dotted images and produce continuous, in principle straight lines on the recording strip. In this manner a graph of the errors is produced which shows the position of the indicator depending on the scale of the dial gauge.

The same object can be achieved in accordance with FIGURE 4 with continuous illumination of the dial in that a slotted shutter device 41 is arranged behind the lens 25 and controlled by a crank 39 in the axis of the motor 1, and a connecting rod 40 is moved up and down in the direction of the arrow. A slotted diaphragm 42 is disposed between the shutter 41 and the sensitive recording paper 43 which is moved continuously by the rollers 44 in the direction of the arrow transversely to the projected rays. The two slots 41a and 42a are so wide that they reduce the height of the projected scale strokes and the pointer practically with two dots.

The operation of the shutter 41 is selected so that an image is always projected on the strip 43 when the pointer is theoretically in front of a mark of the scale. This momentary projection produces a sequence of dots on the strip 43; the successive sequences of points arrange themselves in lines. The sequence of points originating from the pointer yields in practice a more or less pronounced undulating line 43a moving between the straight lines of dividing marks 43b and thereby gives directly the graph of errors in respect to the marks on the scale.

Photographic recording has the disadvantage of the subsequent development process. In the arrangement described hereinafter this disadvantage is eliminated.

As shown in FIGURE 1, the shaft of the motor 1 is provided with a lever 29 on which a photoelectric cell is disposed. This cell scans the image ray S—S periodically. The impulses produced in the cell 28 by the difference of light in the image ray, caused by the projected scale strokes and the pointer, are fed to an amplifier through slip rings 30, passed to a recording device 32 after amplification and recorded there on a strip 33.

The recording operation is shown in greater detail in FIGURE 2.

The dividing marks 7a viewed in the direction of projection and the pointer 10a are scanned in the direction of the arrow by the photoelectric cell 28 which is mounted on the arm 29. The recording pin 34 moves simultaneously in the direction of the arrow over the recording strip 33, which moves from top to bottom (arrow) in FIGURE 2 at a constant speed. Between two sweeps of the arm 29 the recording strip moves by the amount "h."

For the strip 33 a recording material is selected on which, due to an electric current applied between it and the recording pin 34, the curves are blackened. During the sweep of the image ray the photoelectric cell 28 gives a series of voltage impulses which, amplified by the amplifier 31, are recorded on the recording strip as a series of dots by the recording pin 34 simultaneously guided over the strip 33. After an advance of the strip 33 of the value "h" the process is repeated resulting in a system of lines which is formed of the series of points and makes the errors of the pointer visible relatively to the strokes on the scale. The straight lines 35 mark the scale marks 7a, while the position 10a of the pointer is repeated in practice by an undulating line (33a).

With the above-described kinds of recording, it is possible to observe the position of the indicator visually during the recording. In FIGURE 1 the image of the pointer is visible on the screen 26 if it is not covered by the sweeping arm 29. Since this operation lasts only a very short time, only an insignificant disturbance is caused for an observer.

In photographic recording, as shown in FIGURE 3, a semi-silvered mirror 45 can be used in known manner which reflects a part of the recording ray by way of the mirror 46 on to the screen 47 on which the pointer image 10a can be compared with a mark 47a while the recording is proceeding.

I claim:

1. An apparatus for ascertaining the errors of indicator measuring devices which have pointers rotatable about transverse axes, which has an adjusting member adapted to adjust the pointers according to a known measurement value, comprising an optical objective, locating means for locating the indicator measuring device with its pointer aligned with the objective, drive means operatively connected with the adjusting member for rotating the objective about the transverse axis of the pointer corresponding to the known measurement value applied by the adjusting member, optical deflection means carried for rotation with the objective for guiding light rays from the pointer and objective into said axis, further optical deflection means for cancelling movement of said light rays corresponding to the rotation of the objective, and reading means for visibly presenting from said light rays an image of the pointer.

2. An apparatus as claimed in claim 1, in which the further optical deflection means comprises a Dove's prism interposed in said light rays and rotated about said axis with half the angular speed of the objective.

3. An apparatus as claimed in claim 1, having illuminating means rotatable by the adjusting member, for direction at the pointer.

4. An apparatus as claimed in claim 1, having a reference mark and recording means for recording the image of the pointer and the reference mark.

5. An apparatus as claimed in claim 4, having traversing means for continuously moving a light sensitive recording material transversely of the light rays forming the image of the pointer.

6. An apparatus as claimed in claim 1, in which optical holding means are interposed in the optical inlet of said light rays for holding the image of the pointer in fixed relationship to an associated division marked on the indicator measuring device.

7. An apparatus as claimed in claim 6, having traversing means for continuously moving a light sensitive recording material transversely of the light rays forming the image of the pointer, diaphragm means limiting the image in the direction of movement of the material and shutter means operably connected with the adjusting member for cooperating therewith.

8. An apparatus as claimed in claim 6, having an optical electronic scanning head, guide means for traversing it periodically transversely of the light rays forming the image of the pointer, a recorder and connecting means for feeding electrical impulses from the scanning head to the recorder.

9. An apparatus as claimed in claim 6, having illuminating means operable by the adjusting member for periodically illuminating the dial of an indicator measuring device located by the locating means.

10. A testing apparatus for ascertaining the errors of an indication measuring device such as a dial gauge provided with a movable pointer, said dial gauge maintained in a stationary position during testing, the position occupied by the moving pointer of the dial gauge being compared during the test, to the position of a stationary reference mark on a stationary observer viewing means, first optical means for following the path of the moving pointer and reflecting its image to said viewing means, said first optical means located between the measuring device and said viewing means, and second optical means between said first optical means and said viewing means causing the image of the pointer to appear stationary relative to the reference mark to the observer.

References Cited by the Examiner
FOREIGN PATENTS
759,150  10/1956  Great Britain.

LOUIS R. PRINCE, *Primary Examiner.*
S. C. SWISHER, *Assistant Examiner.*